(12) United States Patent
Lin

(10) Patent No.: US 12,712,461 B2
(45) Date of Patent: Aug. 18, 2026

(54) SWITCHING MODE POWER SUPPLY, CONTROL CIRCUIT AND CONTROL METHOD THEREOF

(71) Applicant: Monolithic Power Systems, Inc., Kirkland, WA (US)

(72) Inventor: Yang-Sheng Lin, Taipei City (TW)

(73) Assignee: Monolithic Power Systems, Inc., Kirkland, WA (US)

( * ) Notice: Subject to any disclaimer, the term of this patent is extended or adjusted under 35 U.S.C. 154(b) by 266 days.

(21) Appl. No.: 18/504,403

(22) Filed: Nov. 8, 2023

(65) Prior Publication Data

US 2024/0186906 A1 Jun. 6, 2024

(30) Foreign Application Priority Data

Dec. 2, 2022 (TW) .................................. 111146449

(51) Int. Cl.
*H02M 3/335* (2006.01)
*H02M 1/08* (2006.01)

(52) U.S. Cl.
CPC ......... *H02M 3/33571* (2021.05); *H02M 1/08* (2013.01)

(58) Field of Classification Search
CPC ............... H02M 3/33571; H02M 1/08; H02M 3/33523; H02M 1/0048; H02M 1/088; H02M 3/33569
See application file for complete search history.

(56) References Cited

U.S. PATENT DOCUMENTS 7,522,429 B2 * 4/2009 Usui ........................ H02M 3/01 363/16
10,199,949 B1 * 2/2019 Wong ...................... H02M 1/08
10,742,121 B2 * 8/2020 Liu ................... H02M 3/33569
10,840,817 B1 * 11/2020 Chopra ............. H02M 3/33592
11,671,020 B2 * 6/2023 Yang ................. H02M 3/33592 363/21.15
11,784,572 B2 * 10/2023 Peng ................... H02M 1/0006 327/67
2006/0146584 A1 * 7/2006 Aso ................... H02M 3/33507 363/95
2018/0301975 A1 * 10/2018 Lin ................... H02M 3/33569
2024/0305204 A1 * 9/2024 Chen ................. H02M 3/33515

* cited by examiner

*Primary Examiner* — Kyle J Moody
(74) *Attorney, Agent, or Firm* — Ashurst Perkins Coie US LLP

(57) ABSTRACT

A control circuit for a switching mode power supply is disclosed herein. The switching mode power supply has a primary-side circuit, the primary-side circuit has a first switch, a second switch, and a clamping capacitor. The control circuit includes a voltage detection circuit, an on-time adjustment circuit, and a driving circuit. The voltage detection circuit is coupled to the first terminal of the first switch and configured to detect a voltage signal at the first terminal of the first switch. The on-time adjustment circuit is configured to provide a first on-time signal to adjust an on-time of the first switch according to the voltage signal at the first terminal of the first switch. The driving circuit is configured to provide a driving signal to a control terminal of the first switch according to the first on-time signal.

19 Claims, 12 Drawing Sheets

SWITCHING MODE POWER SUPPLY, CONTROL CIRCUIT AND CONTROL METHOD THEREOF

CROSS-REFERENCE TO RELATED APPLICATIONS

This application claims priority to and the benefit of Taiwan Patent Application No. 111146449, filed on Dec. 2, 2022, which is incorporated herein by reference in its entirety.

TECHNICAL FIELD

The present invention relates to an electric circuit. More particularly, the present invention relates to a switching mode power supply and a control circuit.

BACKGROUND OF THE INVENTION

A traditional switching mode power supply usually includes two switches. A first switch is coupled to a voltage source to receive an input voltage and is usually referred to as a high-side switch, while a second switch is coupled between the first switch and a ground terminal and is usually referred to as a low-side switch. FIGS. 1A and 1B respectively illustrate schematic diagrams of two traditional control mechanisms for a switching mode power supply. As shown in FIG. 1A, the high-side switch $Q_H$ and the low-side switch $Q_L$ are complementarily turned on and off alternatively. In other words, when the high-side switch is turned on (e.g., $Q_H$_Vgs is at a high voltage level), the low-side switch is turned off (e.g., $Q_L$_Vgs is at a low voltage level), and when the high-side switch is turned off (e.g., $Q_H$_Vgs is at the low voltage level), the high-side switch is turned on (e.g., $Q_L$_Vgs is at the high voltage level). In another control mechanism, as shown in FIG. 1B, the high-side switch is turned on with a constant on-time. In this case, no matter how the on-time of the low-side switch is adjusted, the on-time of the high-side switch is fixed at a constant.

The present invention provides a new way to control the on-time of the high-side switch and circuit thereof.

SUMMARY OF THE INVENTION

According to an embodiment of the present invention, a control circuit for a switching mode power supply is provided. The switching mode power supply has a primary-side circuit, the primary-side circuit has a first switch, a second switch, and a clamping capacitor. A first terminal of the first switch is coupled to a terminal of the clamping capacitor, and a second terminal of the first switch is coupled to a first terminal of the second switch. The control circuit includes a voltage detection circuit, an on-time adjustment circuit, and a driving circuit. The voltage detection circuit is coupled to the first terminal of the first switch and configured to detect a voltage signal at the first terminal of the first switch. The on-time adjustment circuit is coupled to the voltage detection circuit and is configured to provide a first on-time signal to adjust an on-time of the first switch according to the voltage signal at the first terminal of the first switch. The driving circuit is coupled to the on-time adjustment circuit and is configured to provide a driving signal to a control terminal of the first switch according to the first on-time signal.

According to an embodiment of the present invention, a method for controlling a switching mode power supply is provided. The switching mode power supply has a first switch and a second switch. The method includes: detecting a voltage signal at a first terminal of the first switch; comparing the voltage signal with a voltage threshold and providing a comparison result; providing a first on-time signal according to the comparison result of the voltage signal and the voltage threshold to adjust an on-time of the first switch; and providing a driving signal to the first switch according to the first on-time signal.

According to an embodiment of the present invention, a switching mode power supply is provided. The switching mode power supply includes a transformer, a primary-side circuit, and a secondary-side circuit. The transformer has a primary winding and a secondary winding. The primary-side circuit is coupled to the primary winding and is configured to receive an input voltage from a voltage input terminal. The primary-side circuit includes a clamping capacitor, a first switch, a second switch, and a clamping control circuit. The clamping capacitor has a first terminal and a second terminal. The first terminal of the clamping capacitor is coupled to the voltage input terminal. The first switch has a first terminal, a second terminal, and a control terminal. The first terminal of the first switch is coupled to the second terminal of the clamping capacitor. The second switch has a first terminal, a second terminal, and a control terminal. The first terminal of the second switch is coupled to the second terminal of the first switch, and the second terminal of the second switch is coupled to a ground terminal. The clamping control circuit includes a voltage detection circuit, an on-time adjustment circuit, and a driving circuit. The voltage detection circuit is coupled to the first terminal of the first switch and is configured to detect a voltage signal at the first terminal of the first switch. The on-time adjustment circuit is coupled to the voltage detection circuit and is configured to, according to the voltage signal at the first terminal of the first switch, provide a first on-time signal to adjust an on-time of the first switch. The driving circuit is coupled to the on-time adjustment circuit and is configured to provide a driving signal to a control terminal of the first switch according to the first on-time signal. The secondary-side circuit is coupled to the secondary winding and is configured to provide an output voltage at a voltage output terminal.

BRIEF DESCRIPTION OF THE DRAWINGS

The present invention can be further understood with reference to following detailed description and appended drawings, wherein like elements are provided with like reference numerals. These drawings are only for illustration purpose, thus may only show part of the devices and are not necessarily drawn to scale.

DETAILED DESCRIPTION

Specific embodiments of the present invention will be described in detail below, and it should be noted that the embodiments described here are only for illustration, not for limiting the present invention. In the following description, numerous specific details are set forth in order to provide a thorough understanding of the present invention. It will be apparent, however, to one skilled in the art that these specific details need not be employed to practice the present invention. In other instances, well-known circuits, materials or methods have not been described in detail in order to avoid obscuring the present invention.

Throughout this description, the phrases "in one embodiment", "in an embodiment", "in some embodiments", "in an example", "in some examples", "in one implementation", and "in some implementations" are used to include both combinations and sub-combinations of various features described herein as well as variations and modifications thereof. These phrases used herein do not necessarily refer to the same embodiment. It is noted that when an element is "connected to" or "coupled to" the other element, it means that the element is directly connected to or coupled to the other element, or that the element is indirectly connected to or coupled to the other element via another element. Terms such as "a", "the" and "these" include pluralities. For ease of description, the transistor used herein is a Metal Oxide Semiconductor Field Effect Transistor (MOSFET) having a first terminal (e.g., drain terminal), a second terminal (e.g., source terminal) and a control terminal (e.g., gate terminal). Those skilled in the art should understand that other types of transistors can also be used, and the coupling manner of the transistors can be modified accordingly. Those of ordinary skill in the art should understand that the meanings of the above terms do not limit these terms, but are only used to provide illustrative examples for these terms.

Figure 1A:
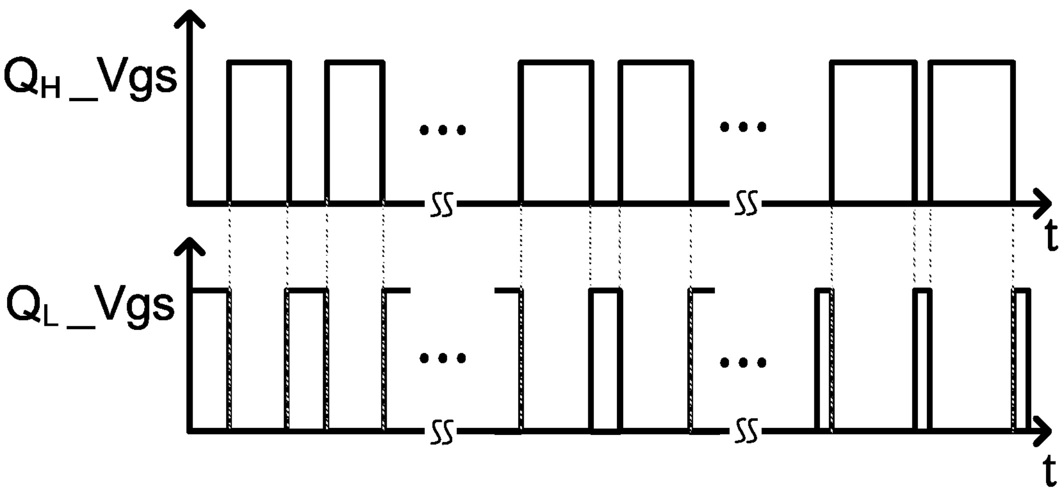
FIGS. 1A and 1B respectively illustrate schematic diagrams of two traditional control mechanisms for a switching mode power supply.
Figure 1B:
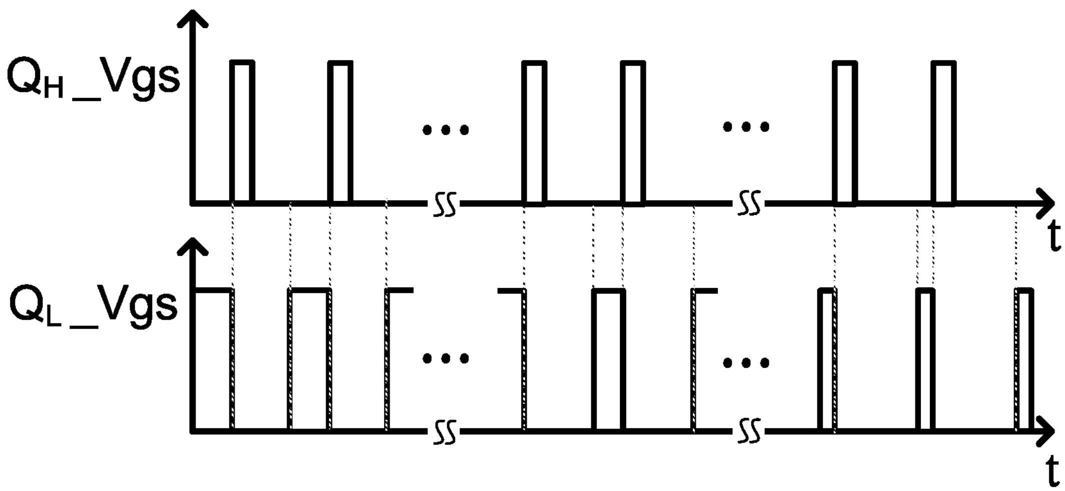
Figure 2:
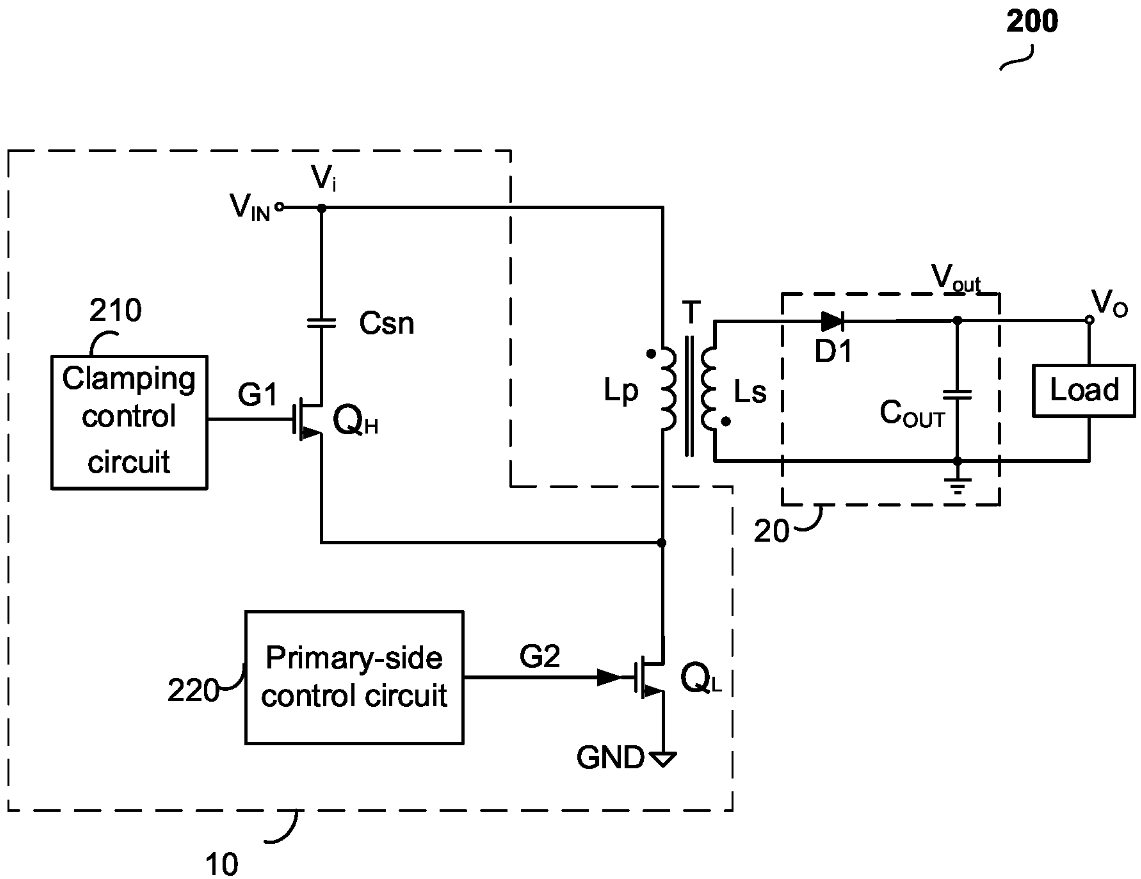
FIG. 2 is a circuit diagram of a switching mode power supply in accordance with an embodiment of the present invention.

The present invention provides a switching mode power supply. FIG. 2 is a circuit diagram of a switching mode power supply 200 in accordance with an embodiment of the present invention. In this embodiment, the switching mode power supply 200 is a flyback converter, which includes a transformer T, a primary-side circuit 10, and a secondary-side circuit 20. The transformer T includes a primary winding Lp and a secondary winding Ls. As shown in FIG. 2, the primary-side circuit 10 is coupled to the primary winding Lp and is configured to receive an input voltage Vi from a voltage input terminal $V_{IN}$. The primary-side circuit 10 includes a clamping capacitor Csn, a first switch $Q_H$, and a second switch $Q_L$. A first terminal of the clamping capacitor Csn is coupled to the voltage input terminal $V_{IN}$. A second terminal of the clamping capacitor Csn is coupled to a first terminal of the first switch $Q_H$. A second terminal of the first switch $Q_H$ is coupled to a first terminal of second switch $Q_L$. A second terminal of second switch $Q_L$ is coupled to a ground terminal GND.

In the embodiment of FIG. 2, the primary-side circuit 10 further includes a clamping control circuit 210 and a primary-side control circuit 220. The clamping control circuit 210 is configured to provide a control signal G1 to a control terminal of the first switch $Q_H$ to control the first switch $Q_H$ to be turned on or off. The primary-side control circuit 220 is configured to provide a control signal G2 to a control terminal of the second switch $Q_L$ to control the second switch $Q_L$ to be turned on or off. When the primary-side control circuit 220 provides a control signal G2 to turn off the second switch $Q_L$, the leakage inductance energy may be recycled by turning on the first switch $Q_H$ to charge the clamping capacitor Csn.

As shown in FIG. 2, the secondary-side circuit 20 is coupled to the secondary winding Ls and is configured to provide the output voltage $V_0$ at a voltage output terminal $V_{OUT}$ to a load. In this embodiment, the secondary-side circuit 20 includes a rectifier diode D1 and an output capacitor $C_{OUT}$.

Figure 3:
FIG. 3 is a schematic diagram of a control circuit for a switching mode power supply in accordance with an embodiment of the present invention.
Figure 3:
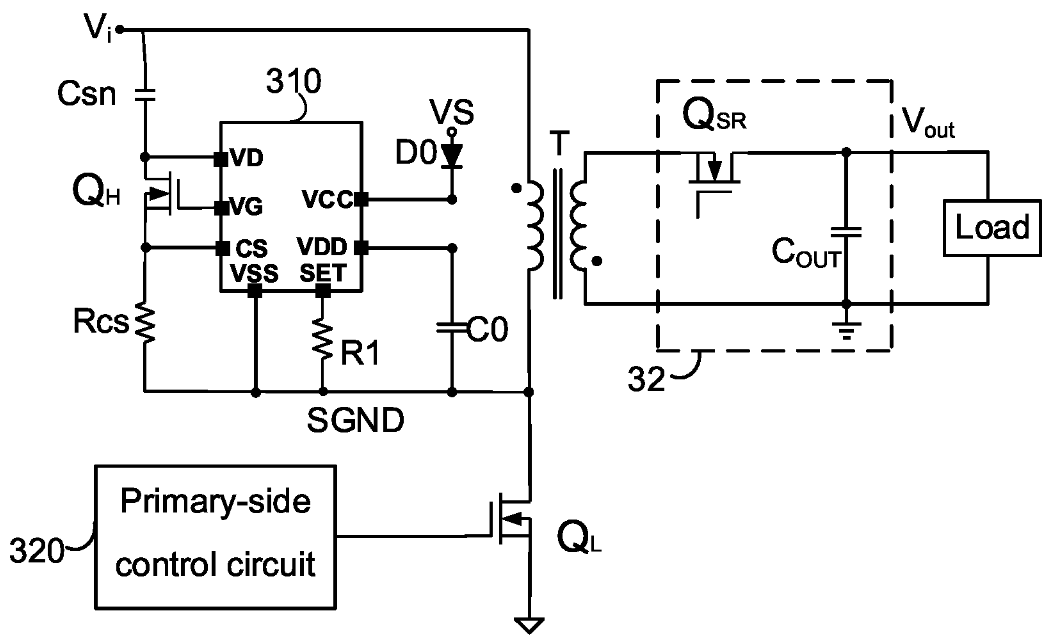

FIG. 3 is a schematic diagram of a control circuit 310 for a switching mode power supply 300 in accordance with an embodiment of the present invention. In this embodiment, the switching mode power supply 300 is a flyback converter, and the clamping control circuit 310 is integrated in an integrated circuit (IC). As shown in FIG. 3, the clamping control circuit 310 includes a VD pin, a VG pin, a VCC pin, and a VSS pin. The VD pin is coupled to the first terminal of the first switch $Q_H$ and is configured to detect a voltage signal of the first switch $Q_H$. The VG pin is coupled to the control terminal of the first switch $Q_H$ and is configured to provide a driving signal to turn on or off the first switch $Q_H$. The VCC pin is coupled to the diode D0 and is configured to receive a voltage source VS through the diode D0. The VSS pin is coupled to an IC ground terminal SGND. In this embodiment, the IC ground terminal is the first terminal of the second switch $Q_L$. In this embodiment, the rectifier diode D1 in the secondary-side circuit 32 may be replaced by a rectifier switch $Q_{SR}$.

In some embodiments, the clamping control circuit 310 further includes more pins, e.g., a CS pin, a SET pin, and/or a VDD pin. For example, the CS pin is configured to sense a current flowing through the first switch $Q_H$, for example, through a current sense resistor $R_{CS}$. The SET pin is coupled to the resistor R1 to set the maximum on-time of the first switch $Q_H$. The VDD pin is coupled to the capacitor C0 and is configured to generate a voltage for a driving circuit.

In one embodiment, the primary-side control circuit 320 is integrated in an IC. In another embodiment, the clamping control circuit 310 and the primary-side control circuit 320 are integrated in a single IC.

Figure 4:
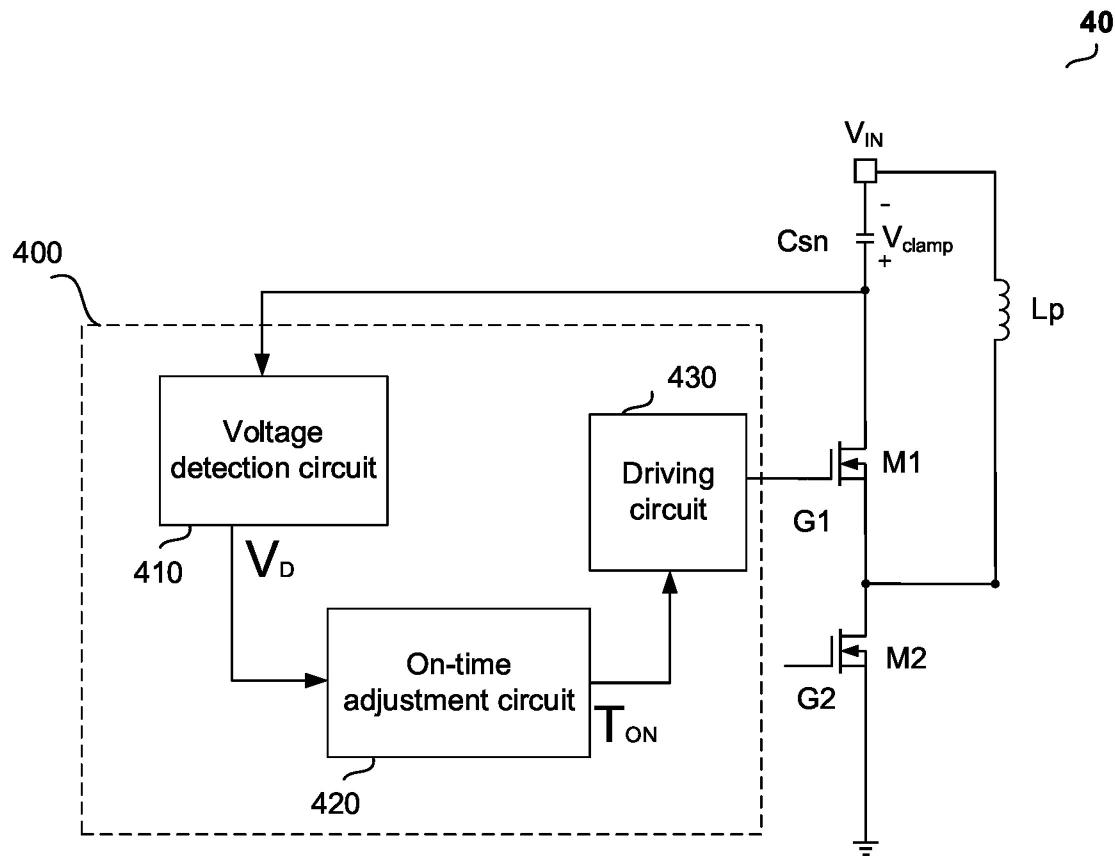
FIG. 4 is a block diagram of a control circuit for a switching mode power supply in accordance with an embodiment of the present invention.

FIG. 4 is a block diagram of a control circuit 400 for a switching mode power supply 40 in accordance with an embodiment of the present invention. In this embodiment, the switching mode power supply 40 includes a first switch M1 and a second switch M2. In some embodiments, the control circuit 400 may be used in the switching mode power supply 200 shown in FIG. 2 and in the switching mode power supply 300 shown in FIG. 3. In some embodiments, the control circuit 400 may be used in a flyback converter. However, the present invention is not limited thereto. In various embodiments, the control circuit 400 may be used in any types of switching mode power supply.

As shown in FIG. 4, the control circuit 400 includes a voltage detection circuit 410, an on-time adjustment circuit 420, and a driving circuit 430. The voltage detection circuit 410 is configured to detect a voltage signal $V_D$ of the first switch M1. Specifically, the voltage detection circuit 410 is coupled to a first terminal of the first switch M1 and the clamping capacitor Csn to detect the voltage signal $V_D$. The on-time adjustment circuit 420 is coupled to the voltage detection circuit 410 and is configured to provide a first on-time signal $T_{ON}$ according to the voltage signal $V_D$ to adjust the on-time of the first switch M1. The driving circuit 430 is coupled to the on-time adjustment circuit 420 and is configured to provide a driving signal G1 to a control terminal of the first switch M1 according to the first on-time signal $T_{ON}$.

In one embodiment, the first on-time signal $T_{ON}$ indicates a turn-on period from the on state to the off state. In another embodiment, the first on-time signal $T_{ON}$ indicates the time that the first switch M1 switches from the on state to the off state. In one embodiment, the first on-time signal $T_{ON}$ includes a pulse signal having a rising edge and a falling edge. In another embodiment, the first on-time signal $T_{ON}$ includes a predetermined time value. In one implementation, the predetermined time value may be programmable via a software or a program to set the on-period of the first switch M1.

Figure 5:
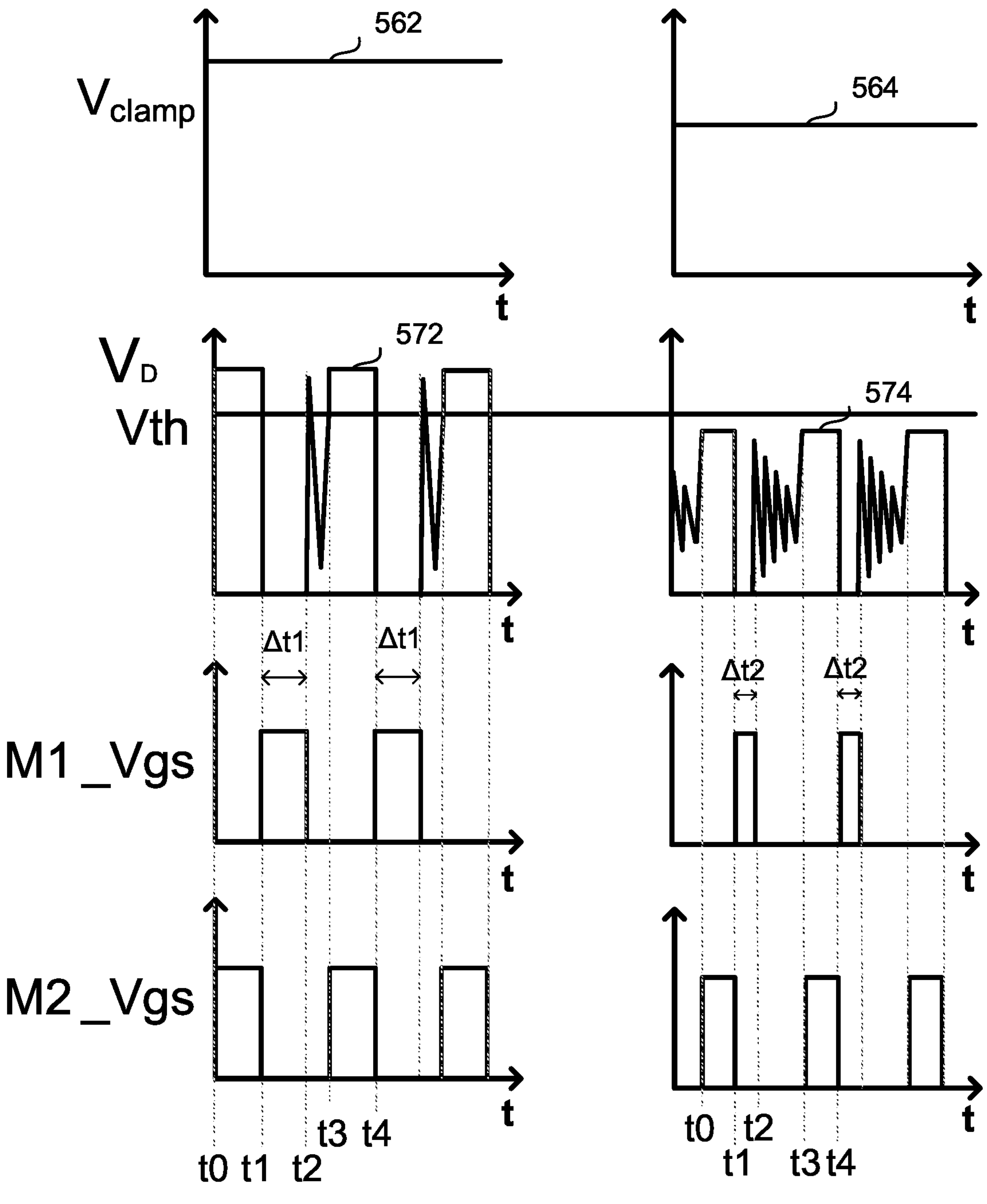
FIG. 5 is a simulated waveform diagram for multiple signals of a control circuit in accordance with an embodiment of the present invention.

FIG. 5 is a simulated waveform diagram for multiple signals of a control circuit (e.g., the control circuit 400 shown in FIG. 4) in accordance with an embodiment of the present invention. In one embodiment, each of the first switch M1 and the second switch M2 is an n-type metal-oxide-semiconductor field-effect transistor (MOSFET) that has a first terminal (e.g., drain), a second terminal (e.g., source), and a control terminal (e.g., gate). The control signal G1/G2 (e.g., the voltage signal $V_{GS}$) is respectively provided to the gate terminal of the switch M1/M2 to turn on the switch M1/M2 in response to a high voltage level (e.g., $V_{GS} \geq Vth$), and to turn off the switch M1/M2 in response to a low voltage level (e.g., $V_{GS} < Vth$). First, at time to, the control signal M2_$V_{GS}$ transitions from a low voltage level to a high voltage level, i.e., the second switch M2 turns on, and the first switch M1 is turned off. At time t1, the control signal M2_$V_{GS}$ that provides to the second switch M2 transitions from the high voltage level to the low voltage level to turn off the second switch M2. At the meantime, the control signal M1_$V_{GS}$ transitions from the low voltage level to the high voltage level to turn on the first switch M1. By turning on the first switch M1 to charge the clamping capacitor Csn, the leakage inductance energy of the primary winding Lp of the transformer T is recycled. At time t2, the control signal M1_$V_{GS}$ transitions from the high voltage level to the low voltage level to turn off the first switch M1. At time t3, the next cycle starts, and the second switch M2 turns on again, until it is turned off at time t4.

By turning on the first switch $Q_H$ to charge the clamping capacitor Csn, the energy of the leakage inductance of the transformer T (e.g., the leakage inductance of the primary winding Lp) is recycled. Since the on-time of the first switch M1 may affect the efficiency of the system, it is desirable to set the on-time of the first switch M1 as short as possible. However, the shorter on-time of the first switch M1 makes the voltage across the clamping capacitor Csn (e.g., $V_{clamp}$ as shown in FIG. 4) become greater. This may cause a spike to occur when the second switch M2 turns off, which damages the clamping capacitor Csn, switches, and/or other components. On the other hand, since the leakage inductance of transformer may have different deviation in mass production, the voltages across the clamp capacitor Csn may be different and hard to predict. Thus, the present invention provides a new way to adjust the on-time of the first switch M1 and circuit thereof.

In one embodiment, the voltage signal $V_D$ of the first switch M1 is detected during the ON state of the second switch M2 (e.g., at any time between time to and t1, or at any time between time t3 and t4). The on-time of the first switch M1 is then adjusted according to the detected voltage signal $V_D$. For example, when the voltage across the clamping capacitor Csn is greater, the on-time of the first switch M1 is adjusted to be longer. As shown in FIG. 5, when the voltage $V_{clamp}$ across the clamping capacitor Csn has a level (as shown in waveform 562) greater than the voltage $V_{clamp}$ (as shown in waveform 564), the time period that the control signal M1_Vgs is at a high voltage level is longer (e.g., $\Delta t1 > \Delta t2$). The control circuit of the present invention extends the on-time of the first switch M1 when the detected voltage signal $V_D$ is greater, to suppress the voltage $V_{clamp}$ across the clamping capacitor Csn, such that the system operates safely without damaging the components. On the other hand, the on-time of the first switch M1 is shortened when the detected voltage signal $V_D$ is lesser, to save the energy consumption and improve the efficiency of the system.

In another embodiment, the voltage signal $V_D$ of the first switch M1 is detected during the off state of the first switch M1 (e.g., at any time between time t2 and t4), and the on-time of the first switch M1 is adjusted according to the level of the detected voltage signal $V_D$. In some embodiments, the voltage signal $V_D$ of the first switch M1 is detected at any time during any cycle, and the on-time of the first switch M1 is adjusted accordingly. In another embodiments, the voltage signal $V_D$ of the first switch M1 is detected at a specific time in each switching cycle, and the on-time of the first switch M1 may be adjusted in the next cycle accordingly. In yet another embodiments, the voltage signal $V_D$ is monitored constantly, and the on-time of the first switch M1 is adjusted instantly.

In one embodiment, the duration of the on-time of the first switch M1 is a predetermined value. For example, the on-time adjustment circuit 420 is further configured to determine whether the voltage signal $V_D$ is less than a voltage threshold (e.g., Vth). When the voltage signal $V_D$ is less than the voltage threshold Vth (e.g., the level of the waveform 574 of the voltage signal $V_D$ is less than Vth), the on-time of the first switch M1 is a first value (e.g., $\Delta t2$); and when the voltage signal $V_D$ is greater than the voltage threshold Vth (e.g., the level of the waveform 572 of the voltage signal $V_D$ is greater than Vth), the on-time of the first switch M1 is a second value (e.g., $\Delta t1$, where $\Delta t1 > \Delta t2$).

In another embodiment, the voltage signal $V_D$ at the first terminal of the first switch M1 has a positive correlation with the on-time of the first switch M1. For example, the voltage detection circuit 410 shown in FIG. 4 includes a sample-and-hold circuit. The sample-and-hold is configured to sample the voltage signal $V_D$ at the first terminal of the first switch M1 when the first switch M1 is in the off state, and hold the sampled voltage signal $V_D$ as a sample-and-hold voltage $V_{SH}$. In one embodiment, the on-time adjustment circuit 420 shown in FIG. 4 includes a pull-down circuit and a logic circuit. The pull-down circuit is configured to pull down the sample-and-hold voltage $V_{SH}$ when the first switch M1 is turned on. The logic circuit is configured to provide an off indication signal when the sample-and-hold voltage $V_{SH}$ is pulled down to a reference voltage $V_{ref}$. The off indication signal indicates a time to turn off the first switch M1. In other words, when the sampled voltage signal $V_D$ at the first terminal of the first switch M1 (i.e., sample-and-hold voltage $V_{SH}$) has a greater value, since it takes longer time to discharge and pull down the sample-and-hold voltage $V_{SH}$ to the reference voltage $V_{ref}$, the off indication signal turns off the first switch M1 later, and the first switch M1 may have a longer on-time. On the contrary, when the sampled voltage signal $V_D$ at the first terminal of the first switch M1 (i.e., sample-and-hold voltage $V_{SH}$) has a less value, since it takes shorter time to discharge and pull down the sample-and-hold voltage $V_{SH}$ to the reference voltage $V_{ref}$, the off indication signal may turn off the first switch M1 earlier, and the first switch M1 may have a shorter on-time.

Figure 6:
FIG. 6 is a block diagram of a control circuit in accordance with another embodiment of the present invention.
Figure 6:
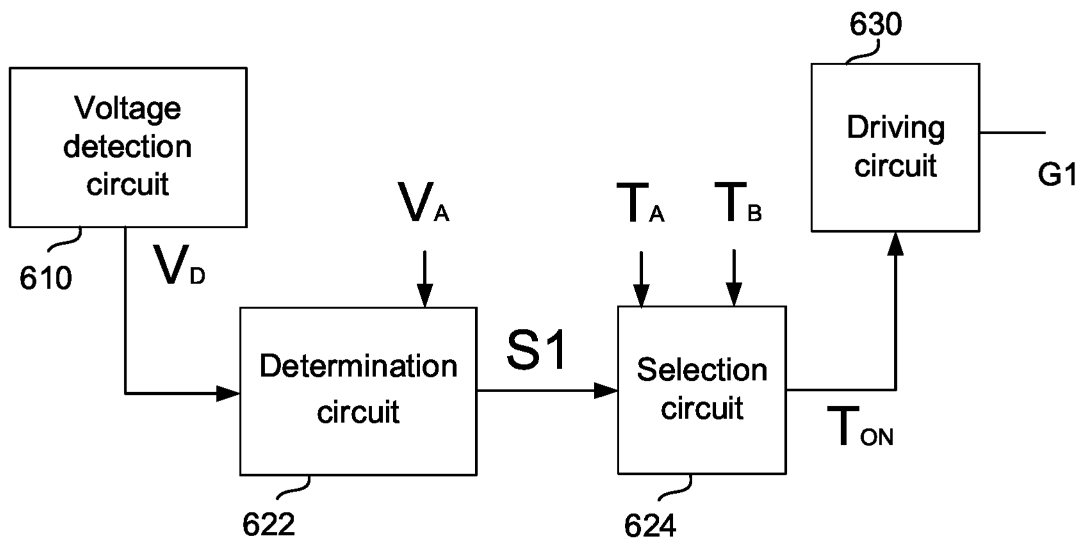

FIG. 6 is a block diagram of a control circuit 600 in accordance with another embodiment of the present invention. Compared with the control circuit 400 in FIG. 4, in the embodiment of FIG. 6, the on-time adjustment circuit further includes a determination 622 and a selection circuit 624. The determination circuit 622 is configured to compare the voltage signal $V_D$ with at least one voltage threshold $V_A$ to determine the voltage level of the voltage signal $V_D$, which is, for example, indicated by a signal S1. The selection circuit 624 is configured to select an on-time value among multiple on-time values (e.g., TA and TB) as the on-time of the first switch M1 according to the voltage level of the voltage signal $V_D$. The driving circuit 630 is configured to provide a driving signal G1 to the control terminal of the first switch M1 according to the first on-time signal $T_{ON}$. For example, the voltage signal $V_D$ may be divided into multiple levels according to multiple predetermined voltage thresholds, and the on-time value corresponding to the level of the voltage signal $V_D$ is selected from multiple on-time values to adjust the on-time of the first switch M1, where each on-time value corresponds to each level of the voltage signal $V_D$. In one embodiment, the maximum value of the voltage signal $V_D$ is detected to adjust the on-time of the first switch M1. In another embodiment, the voltage signal $V_D$ is constantly monitored to obtain the detected voltage signal $V_D$ at a steady state to adjust the on-time of the first switch M1. However, the present invention is not limited thereto. In another embodiments, the detected voltage signal $V_D$ may be detected at any condition or compared with one or more voltage threshold $V_A$ to determine the appropriate on-time for the first switch M1.

Figure 7:
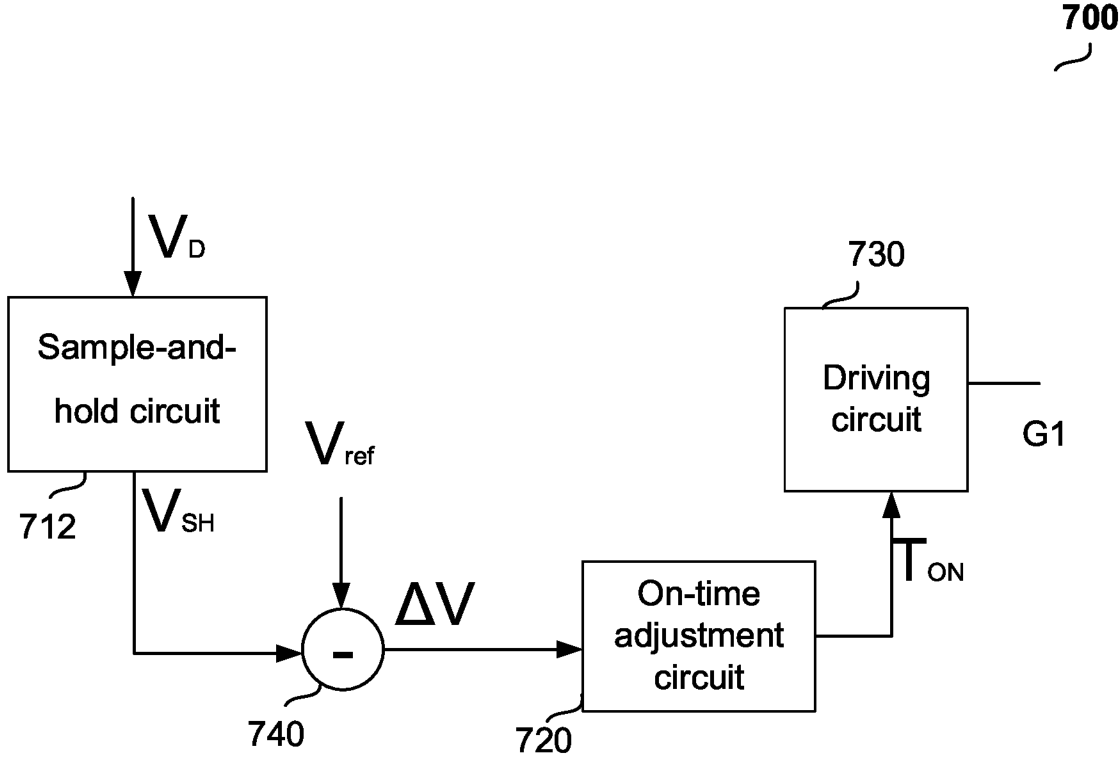
FIG. 7 is a block diagram of a control circuit in accordance with yet another embodiment of the present invention.

FIG. 7 is a block diagram of a control circuit 700 in accordance with yet another embodiment of the present invention. Compared with the control circuit 400 in FIG. 4, in the embodiment of FIG. 7, the voltage detection circuit further includes a sample-and-hold circuit 712 configured to sample the voltage signal $V_D$ at the first terminal of the first switch M1 when the first switch M1 is turned off, and hold the sampled voltage signal $V_D$ as the sample-and-hold voltage $V_{SH}$. In this embodiment, the control circuit 700 further includes a comparison circuit 740 configured to compare the sample-and-hold voltage $V_{SH}$ with the reference voltage $V_{ref}$ to provide a voltage difference $\Delta V$. The on-time adjustment circuit 720 adjusts the on-time of the first switch M1 according to the voltage difference $\Delta V$. The driving circuit 730 is configured to provide the driving signal G1 to the control terminal of the first switch M1 according to the first on-time signal $T_{ON}$.

In one embodiment, there is a positive correlation between the voltage difference $\Delta V$ and the on-time of the first switch M1. The positive correlation indicates that the voltage difference $\Delta V$ and the on-time of the first switch M1 change in the same direction. That is, when the voltage difference $\Delta V$ increases, the on-time of the first switch M1 becomes longer, and when the voltage difference $\Delta V$ decreases, the on-time of the first switch M1 becomes shorter. In one example, the relationship between the voltage difference $\Delta V$ and the on-time of the first switch M1 is represented as a linear function. For example, the on-time $t_{ON}$ of the first switch M1 is expressed as, $t_{ON}=\alpha\times\Delta V+t_{ON,min}$, where a is a coefficient, $t_{ON,\ min}$ is the minimum on-time of the first switch M1. In one implementation, the minimum on-time $t_{ON,\ min}$ of the first switch M1 represents the recycle energy when the second switch M2 turns off. In another implementation, the on-time $t_{ON}$ of the first switch M1 may be adjusted to not exceed a predetermined maximum on-time. However, the present invention is not limited thereto. The voltage difference $\Delta V$ and the on-time of the first switch M1 are not necessarily proportional to each other. In another example, the on-time of the first switch M1 may be adjusted in a non-linear manner, or may be adjusted according to the voltage difference $\Delta V$ in any positive-correlation trend.

Figure 8:
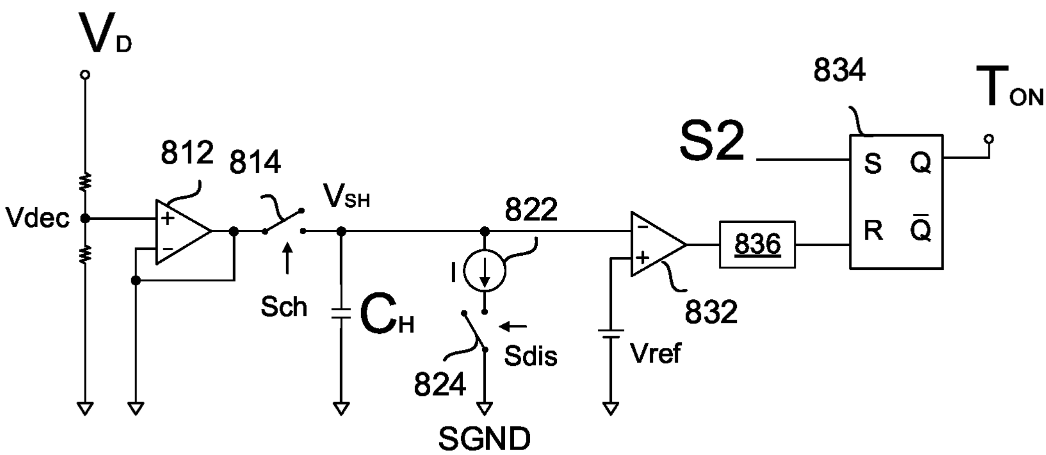
FIG. 8 is a circuit diagram of a control circuit in accordance with an embodiment of the present invention.

FIG. 8 is a circuit diagram of a control circuit 800 in accordance with an embodiment of the present invention. In this embodiment, the control circuit 800 includes the sample-and-hold circuit, the on-time adjustment circuit, and the driving circuit. For the purpose of brevity, since persons having ordinary skills in the art will understand the working principle and implementation of the driving circuit, the driving circuit is not illustrated in FIG. 8, and relevant description is omitted as well.

The sample-and-hold circuit includes an amplifier circuit 812, a sampling switch 814, and a holding capacitor $C_H$. The amplifier circuit 812 has a first input terminal, a second input terminal, and an output terminal. The first input terminal of the amplifier circuit 812 is coupled to the first terminal of the first switch M1 and is configured to receive the voltage signal $V_D$. In this embodiment, a non-inverting input terminal of the amplifier circuit 812 is coupled to the first terminal of the first switch M1 through a voltage divider and is configured to receive a divided voltage signal Vdec of the voltage signal $V_D$, and an inverting input terminal of the amplifier circuit 812 is coupled to the output terminal of the amplifier circuit 812. The sampling switch 814 has a first terminal, a second terminal, and a control terminal. The first terminal of the sampling switch 814 is coupled to the output terminal of the amplifier circuit 812, the second terminal of the sampling switch 814 is coupled to the holding capacitor $C_H$, and the control terminal of the sampling switch 814 is configured to be turned on or off according to a control signal Sch. The holding capacitor $C_H$ is configured to provide the sample-and-hold voltage $V_{SH}$.

In this embodiment, the on-time adjustment circuit includes the pull-down circuit and the logic circuit. As shown in FIG. 8, the pull-down circuit includes a current source 822 and a discharging switch 824. The current source 822 is coupled to the holding capacitor $C_H$ and is configured to provide a current I. The discharging switch 824 is coupled between the current source 822 and the reference terminal SGND and is configured to be turned on or off according to a control signal Sdis. When the discharging switch 824 is turned on, the sample-and-hold voltage $V_{SH}$ across the holding capacitor $C_H$ is pulled down.

The logic circuit includes a comparator 832, a flip-flop 834, and a one-shot circuit 836. The comparator 832 has a first input terminal, a second input terminal, and an output terminal. The first input terminal of the comparator 832 is coupled to the pull-down circuit, and the second input terminal of the comparator 832 is configured to receive the reference voltage $V_{ref}$. The flip-flop 834 has a set input terminal S, a reset input terminal R, and an output terminal Q. The reset input terminal R of the flip-flop 834 is coupled to the output terminal of the comparator 832. Specifically, the inverting input terminal of the comparator 832 is coupled to the holding capacitor $C_H$ to receive the sample-and-hold voltage $V_{SH}$, and the non-inverting input terminal of the comparator 832 is configured to receive the reference voltage $V_{ref}$. When the sample-and-hold voltage $V_{SH}$ is pulled down to be equal to the reference voltage $V_{ref}$, the one-shot circuit 836 is triggered to provide a one-shot signal, and the one-shot signal resets the flip-flop 834 to provide a signal to turn off the first switch M1. In one embodiment, the set input terminal S of the flip-flop 834 is configured to receive a control signal S2. In some embodiments, the control signal S2 is a signal indicative of turning on the first switch M1, and the first on-time signal $T_{ON}$ is provided at the output terminal Q. For example, at the time the second switch M2 switches to the off state, the flip-flop 834 is set, and the first switch M1 switches to the on state.

Figure 9:
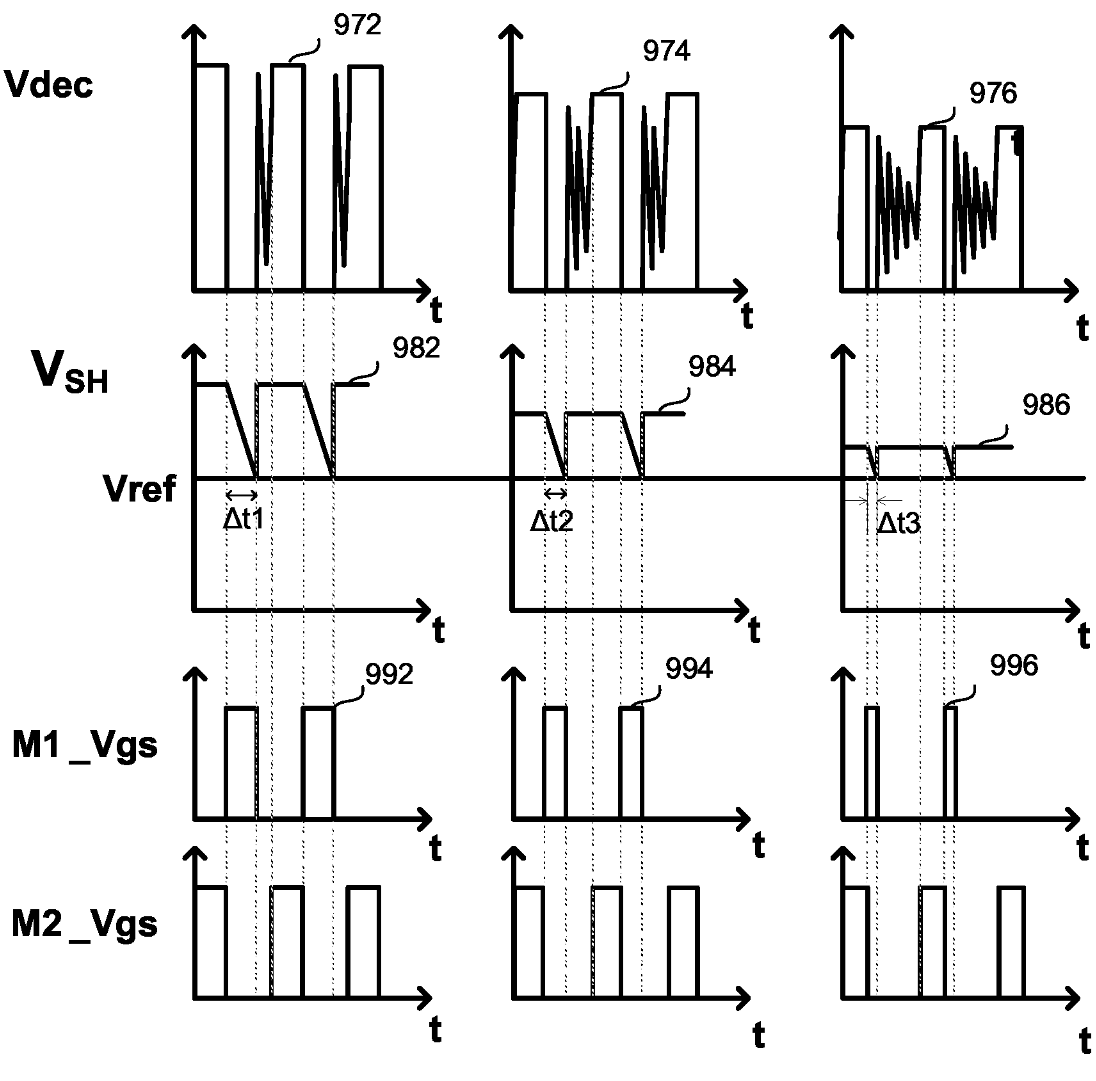
FIG. 9 is a simulated waveform diagram for multiple signals of the control circuit as shown in FIG. 8 in accordance with an embodiment of the present invention.

FIG. 9 is a simulated waveform diagram for multiple signals of the control circuit 800 as shown in FIG. 8 in accordance with an embodiment of the present invention. Since the discharging rate of the holding capacitor $C_H$ (i.e., the rate that the sample-and-hold voltage $V_{SH}$ decreases) is determined by the current source 822 when the discharging switch 824 is turned on, when the sampled divided voltage signal Vdec is greater, it takes longer time to discharge and pull down the sample-and-hold voltage $V_{SH}$ to be equal to the reference voltage $V_{ref}$, and thus the control signal of the first switch M1 has a longer on-time. As shown in FIG. 9, the level of the divided voltage signal Vdec as shown in the waveform 972 is greater than that as shown in the waveform 974, and that as shown in the waveform 974 is greater than that as shown in the waveform 976. Thus, the time that it takes for the sample-and-hold voltage $V_{SH}$ to be pulled down to the reference voltage $V_{ref}$, i.e., the time $\Delta t1$ as shown in the waveform 982, is longer than the time $\Delta t2$ as shown in the waveform 984, and the time $\Delta t2$ is longer than the time $\Delta t3$ as shown in the waveform 986. Accordingly, the time period that the control signal M1_Vgs is at a high voltage level as shown in the waveform 992 is longer than that as shown in the waveform 994, and that as shown in the waveform 994 is longer than that as shown in the waveform 996. In other words, the voltage signal $V_D$ at the first terminal of the first switch M1 has a positive correlation with the on-time of the first switch M1. Since the control circuit in the present invention optimally adjusts the on-time of the first switch according to the detected voltage signal, safe operation without damaging components is ensured, and the efficiency of the system is improved.

As shown in FIG. 8, the sampling switch 814 is turned on or off according to a control signal Sch. In the embodiment of FIG. 9, the control signal Sch is synchronized with the off-state of the first switch M1. In other words, the control signal Sch may be the output signal $\overline{Q}$ of the flip-flop 834. In another embodiment, the control signal Sch controls the sampling switch 814 to be turned on when the second switch M2 is in the on-state. As shown in FIG. 8, the discharging switch 824 is turned on or off according to the control signal Sdis. In the embodiment of FIG. 9, the control signal Sdis is synchronized with the on-state of the first switch M1. In other words, the control signal Sdis may be the output signal Q of the flip-flop 834.

It should be understood that the control circuits and their components and waveforms of signals are merely exemplary for illustration purpose. The present invention is not limited thereto. Persons having ordinary skills in the art may design circuits with different structures and use the corresponding signal forms according to practical application, in order to implement the present invention and perform corresponding functions. For example, the control circuits 400-800, the voltage detection circuit 410, the on-time adjustment circuit 420, the driving circuit 430, the sample-and-hold circuit 712, the comparison 740, the determination circuit 622, the pull-down circuit, and/or the logic circuit may be implemented through digital circuit, analog circuit, software, or any combination thereof.

For ease of description, in the present invention, the control signals, the voltage signals, and the on-time signals are switched between different states synchronously. However, the present invention is not limited thereto. In some embodiments, during the switching between different states, a delay time may be set between the detected voltage signal, the on-time signals, the control signals, and the driving signals, or a delay occurs at the rising edge or the falling edge of these signals according to practical applications. Thus, the time points of these signals could be adjusted to have the delay time according to practical applications to realize the control circuits of the present invention.

Figure 10:
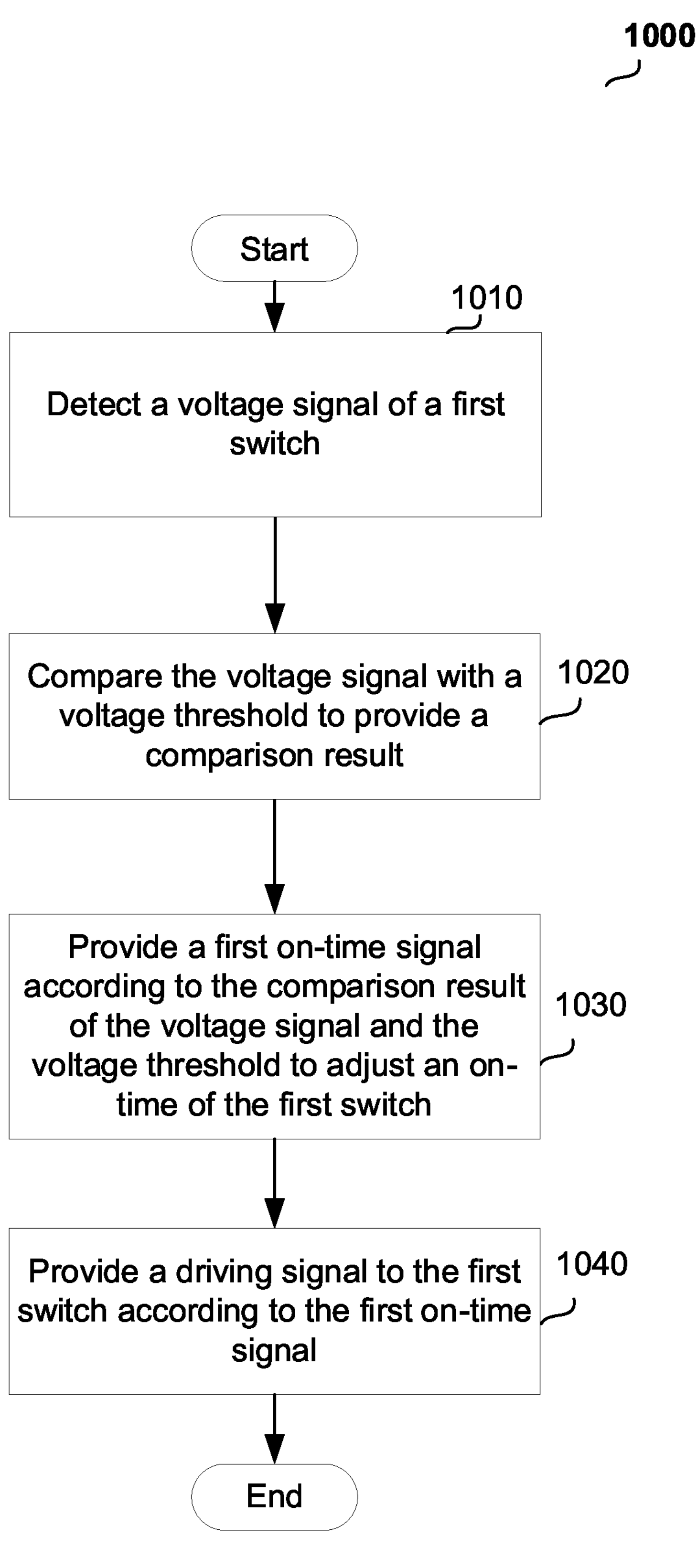
FIG. 10 is a flowchart of a method for controlling a switching mode power supply in accordance with an embodiment of the present invention.

FIG. 10 is a flowchart of a method 1000 for controlling a switching mode power supply in accordance with an embodiment of the present invention. The method 1000 may be performed by the control circuits shown in FIGS. 4, 6, 7, and/or 8. It should be understood that the method 1000 may also be performed by other circuits or components. The method 1000 includes steps 1010 to 1040.

At step 1010, a voltage signal of a first switch is detected. At step 1020, the voltage signal is compared with a voltage threshold to provide a comparison result. At step 1030, a first on-time signal is provided according to the comparison result of the voltage signal and the voltage threshold to adjust an on-time of the first switch. At step 1040, a driving signal is provided to the first switch according to the first on-time signal.

Figure 11:
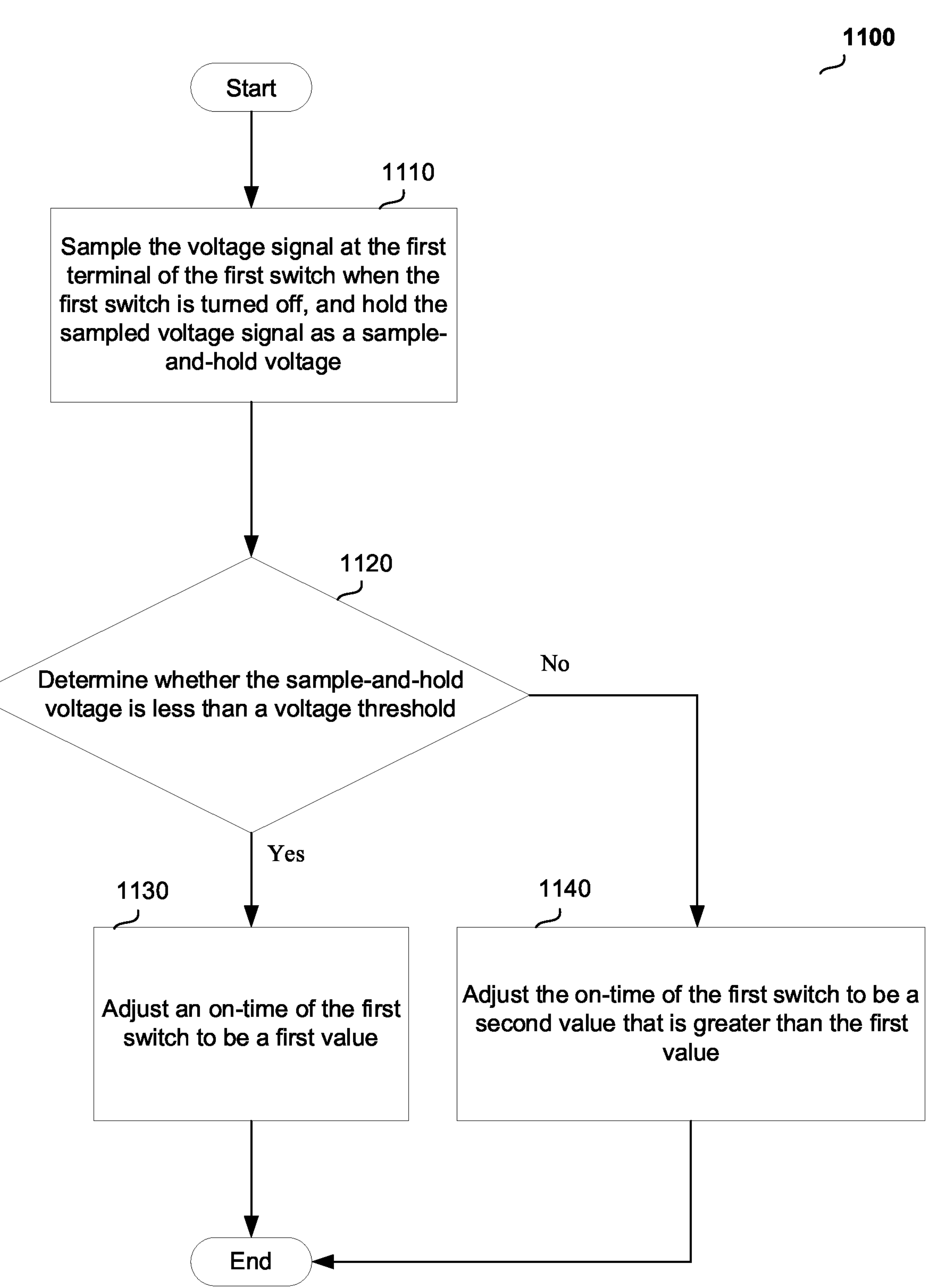
FIG. 11 is a flowchart of a method for controlling a switching mode power supply in accordance with another embodiment of the present invention.

FIG. 11 is a flowchart of a method 1100 for controlling a switching mode power supply in accordance with another embodiment of the present invention. The method 1100 may be performed by the control circuits shown in FIGS. 4, 6, 7, and/or 8. It should be understood that the method 1100 may also be performed by other circuits or components. The method 1100 includes steps 1110 to 1140.

At step 1110, the voltage signal at the first terminal of the first switch is sampled when the first switch is turned off, and the sampled voltage signal is held as a sample-and-hold voltage. At step 1120, whether the sample-and-hold voltage is less than a voltage threshold is determined. When the sample-and-hold voltage is determined to be less than the voltage threshold, the step 1130 is performed. At step 1130, an on-time of the first switch is adjusted to be a first value. On the other hand, if the sample-and-hold voltage is determined to be not less than the voltage threshold, the step 1140 is performed. At step 1140, the on-time of the first switch is adjusted to be a second value. The second value is greater than the first value.

Figure 12:
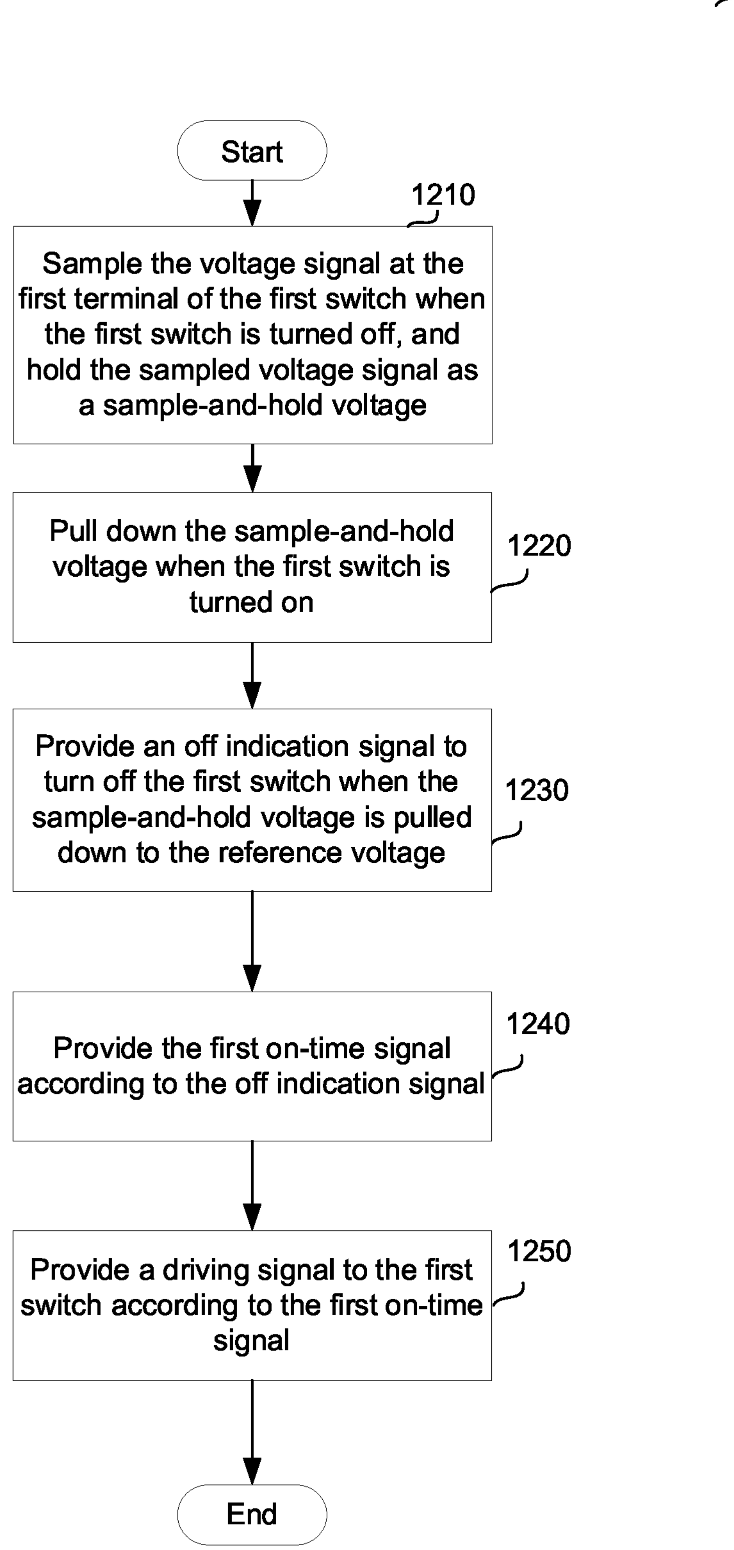
FIG. 12 is a flowchart of a method for controlling a switching mode power supply in accordance with yet another embodiment of the present invention.

FIG. 12 is a flowchart of a method 1200 for controlling a switching mode power supply in accordance with yet another embodiment of the present invention. The method 1200 may be performed by the control circuits shown in FIGS. 4, 6, 7, and/or 8. It should be understood that the method 1200 may also be performed by other circuits or components. The method 1200 includes steps 1210 to 1250.

At step 1210, the voltage signal at the first terminal of the first switch is sampled when the first switch is turned off, and the sampled voltage signal is held as a sample-and-hold voltage. At step 1220, the sample-and-hold voltage is pulled down when the first switch is turned on. At step 1230, an off indication signal is provided to turn off the first switch when the sample-and-hold voltage is pulled down to the reference voltage. At step 1240, the first on-time signal is provided according to the off indication signal. At step 1250, a driving signal is provided to the first switch according to the first on-time signal.

In conclusion, the present invention provides a switching mode power supply, a control circuit, and a method for controlling the switching mode power supply. While various embodiments have been described above to illustrate the present invention, it should be understood that they have been presented by way of example only, and not limitation. Rather, the scope of the present invention is defined by the following claims and includes combinations and sub-combinations of the various features described above, as well as variations and modifications thereof, which would occur to persons skilled in the art upon reading the foregoing description.

What is claimed is:

1. A control circuit for a switching mode power supply with a first switch and a second switch, and the control circuit comprises:

a voltage detection circuit coupled to a clamping capacitor coupled to a first terminal of the first switch and configured to detect a voltage signal at the first terminal of the first switch;

an on-time adjustment circuit coupled to the voltage detection circuit and configured to provide a first on-time signal to adjust an on-time of the first switch according to the voltage signal at the first terminal of the first switch; and a driving circuit coupled to the on-time adjustment circuit and configured to provide a driving signal to a control terminal of the first switch according to the first on-time signal.

2. The control circuit of claim 1, wherein the on-time adjustment circuit is further configured to determine whether the voltage signal is less than a voltage threshold;

when the voltage signal is less than the voltage threshold, the on-time of the first switch has a first value; and when the voltage signal is greater than the voltage threshold, the on-time of the first switch has a second value that is greater than the first value.

3. The control circuit of claim 1, wherein the voltage detection circuit comprises:

a sample-and-hold circuit configured to sample the voltage signal at the first terminal of the first switch when the first switch is turned off, and hold the sampled voltage signal as a sample-and-hold voltage.

4. The control circuit of claim 3, further comprising:

a comparison circuit configured to compare the sample-and-hold voltage with a reference voltage to provide a voltage difference;

wherein the on-time adjustment circuit is further configured to adjust the on-time of the first switch according to the voltage difference, and the voltage difference has a positive correlation with the on-time of the first switch.

5. The control circuit of claim 4, wherein the on-time adjustment circuit further comprises:

a pull-down circuit configured to pull down the sample-and-hold voltage when the first switch is turned on; and a logic circuit configured to provide an off indication signal when the sample-and-hold voltage is pulled down to the reference voltage, wherein the off indication signal indicates a time to turn off the first switch.

6. The control circuit of claim 5, wherein the sample-and-hold circuit comprises:

an amplifier circuit having a first input terminal, a second input terminal, and an output terminal, wherein the first input terminal of the amplifier circuit is coupled to the first terminal of the first switch and is configured to receive the voltage signal;

a sampling switch having a first terminal, a second terminal, and a control terminal, wherein the first terminal of the sampling switch is coupled to the output terminal of the amplifier circuit; and a holding capacitor coupled to the second terminal of the sampling switch and configured to provide the sample-and-hold voltage.

7. The control circuit of claim 6, wherein the pull-down circuit comprises:

a current source coupled to the holding capacitor and configured to provide a current; and a discharging switch coupled between the current source and a reference terminal, wherein when the discharging switch is turned on, the sample-and-hold voltage across the holding capacitor is pulled down.

8. The control circuit of claim 7, wherein the logic circuit comprises:

a comparator having a first input terminal, a second input terminal, and an output terminal, wherein the first input terminal of the comparator is coupled to the pull-down circuit, and the second input terminal of the comparator is configured to receive a reference voltage;

a flip-flop having a set input terminal, a reset input terminal, and an output terminal, wherein the reset input terminal of the flip-flop is coupled to the output terminal of the comparator, and the flip-flop is configured to be reset to turn off the first switch when the sample-and-hold voltage is pulled down to the reference voltage.

9. The control circuit of claim 1, wherein the on-time adjustment circuit comprises:

a determination circuit configured to compare the voltage signal with at least one voltage threshold to determine a level of the voltage signal; and a selection circuit configured to select an on-time value among a plurality of on-time values as the on-time of the first switch according to the level of the voltage signal.

10. A method for controlling a switching mode power supply with a first switch and a second switch, and the method comprises:

detecting a voltage signal at a first terminal of the first switch;

comparing the voltage signal with a voltage threshold and providing a comparison result;

providing a first on-time signal according to the comparison result of the voltage signal and the voltage threshold to adjust an on-time of the first switch; and providing a driving signal to the first switch according to the first on-time signal.

11. The method of claim 10, wherein when the voltage signal is less than the voltage threshold, the on-time of the first switch has a first value, and when the voltage signal is greater than the voltage threshold, the on-time of the first switch has a second value that is greater than the first value.

12. The method of claim 10, wherein the method further comprises:

sampling the voltage signal at the first terminal of the first switch when the first switch is turned off, and holding the sampled voltage signal as a sample-and-hold voltage.

13. The method of claim 12, wherein the method further comprises:

comparing the sample-and-hold voltage with a reference voltage and providing a voltage difference;

wherein the voltage difference has a positive correlation with the on-time of the first switch.

14. The method of claim 12, wherein the method further comprises:

pulling down the sample-and-hold voltage when the first switch is turned on; and providing an off indication signal to turn off the first switch when the sample-and-hold voltage is pulled down to the reference voltage.

15. The method of claim 10, wherein the method further comprises:

comparing the voltage signal with at least one voltage threshold to determine a level of the voltage signal; and selecting an on-time value among a plurality of on-time values as the on-time of the first switch according to the level of the voltage signal.

16. A switching mode power supply, comprising:

a transformer having a primary winding and a secondary winding;

a primary-side circuit coupled to the primary winding and configured to receive an input voltage from a voltage input terminal, wherein the primary-side circuit comprises:

a clamping capacitor having a first terminal and a second terminal, wherein the first terminal of the clamping capacitor is coupled to the voltage input terminal;

a first switch having a first terminal, a second terminal, and a control terminal, wherein the first terminal of the first switch is coupled to the second terminal of the clamping capacitor;

a second switch having a first terminal, a second terminal, and a control terminal, wherein the first terminal of the second switch is coupled to the second terminal of the first switch, and the second terminal of the second switch is coupled to a ground terminal; and a clamping control circuit, comprising:

a voltage detection circuit coupled to the first terminal of the first switch and configured to detect a voltage signal at the first terminal of the first switch;

an on-time adjustment circuit coupled to the voltage detection circuit and configured to, according to the voltage signal at the first terminal of the first switch, provide a first on-time signal to adjust an on-time of the first switch; and a driving circuit coupled to the on-time adjustment circuit and configured to provide a driving signal to a control terminal of the first switch according to the first on-time signal; and a secondary-side circuit coupled to the secondary winding and configured to provide an output voltage at a voltage output terminal.

17. The switching mode power supply of claim 16, wherein the on-time adjustment circuit is further configured to determine whether the voltage signal is less than a voltage threshold;

when the voltage signal is less than the voltage threshold, the on-time of the first switch has a first value; and when the voltage signal is greater than the voltage threshold, the on-time of the first switch has a second value that is greater than the first value.

18. The switching mode power supply of claim 16, wherein the voltage detection circuit comprises:

a sample-and-hold circuit configured to, when the first switch is turned off, sample the voltage signal at the first terminal of the first switch and hold the voltage signal as a sample-and-hold voltage.

19. The switching mode power supply of claim 18, wherein the on-time adjustment circuit further comprises:

a pull-down circuit configured to, when the first switch is turned on, pull down the sample-and-hold voltage; and a logic circuit configured to, when the sample-and-hold voltage is pulled down to the reference voltage, provide an off indication signal to turn off the first switch.

* * * * *